(12) United States Patent
De La Fuente Carnero et al.

(10) Patent No.: US 9,656,759 B2
(45) Date of Patent: May 23, 2017

(54) COLLAPSIBLE SECURING SYSTEM FOR SECURING MEDICAL OXYGEN CYLINDERS FOR AIRCRAFT PASSENGER SEATS

(71) Applicant: Airbus Defence and Space S.A., Madrid (ES)

(72) Inventors: Jose Luis De La Fuente Carnero, Madrid (ES); Victor Julian Sanchez Barreda, Madrid (ES)

(73) Assignee: Airbus Defence and Space S.A., Madrid (ES)

( * ) Notice: Subject to any disclaimer, the term of this patent is extended or adjusted under 35 U.S.C. 154(b) by 16 days.

(21) Appl. No.: 14/932,741

(22) Filed: Nov. 4, 2015

(65) Prior Publication Data
US 2016/0122026 A1 May 5, 2016

(30) Foreign Application Priority Data
Nov. 4, 2014 (EP) .................................... 14382435

(51) Int. Cl.
*A62B 9/04* (2006.01)
*B64D 25/00* (2006.01)
*F16M 13/02* (2006.01)
*A62B 25/00* (2006.01)

(52) U.S. Cl.
CPC ............... *B64D 25/00* (2013.01); *A62B 9/04* (2013.01); *A62B 25/005* (2013.01); *F16M 13/02* (2013.01)

(58) Field of Classification Search
CPC ....... B64D 25/00; A62B 25/00; A62B 25/005; A62B 9/04; A62C 13/78; F17C 13/084; F17C 2205/0107; F17C 2205/0157; F17C 2205/0165; F17C 2205/018; F17C 2205/013; F17C 2270/0168

USPC ......................................................... 224/275
See application file for complete search history.

(56) References Cited

U.S. PATENT DOCUMENTS

| 5,025,935 A | * | 6/1991 | Hadachek | B63C 11/02 211/60.1 |
| 5,154,374 A | | 10/1992 | Beroth | |
| 5,431,422 A | * | 7/1995 | Gamache | B62B 1/264 280/47.19 |
| 5,975,475 A | * | 11/1999 | Chaplin | A62C 13/78 169/51 |

(Continued)

FOREIGN PATENT DOCUMENTS

| EP | 2 420 292 A1 | 2/2012 |
| KR | 10-1111159 B1 | 2/2012 |

OTHER PUBLICATIONS

European Search Report issued in European Application No. 14382435, dated Apr. 21, 2015.

*Primary Examiner* — Corey Skurdal
(74) *Attorney, Agent, or Firm* — Nixon & Vanderhye P.C.

(57) ABSTRACT

A collapsible securing system for securing medical oxygen cylinders for passenger seats including: (i) a base configured such as to be positioned on the passenger seat; (ii) an intermediate securing structure for oxygen cylinders connected to the base by three legs; (iii) a gripping structure, connected to the intermediate securing structure by at least one pivot in common with the intermediate securing structure, and (iv) a fitting system comprising the seatbelt and two straps secured from one end the gripping structure and from the other end thereof to the fitting of the seatbelt to the passenger seat.

15 Claims, 4 Drawing Sheets

(56) References Cited

U.S. PATENT DOCUMENTS

| | | | | |
|---|---|---|---|---|
| 6,056,255 A | * | 5/2000 | Meade | F17C 13/084 |
| | | | | 211/85.18 |
| 6,161,706 A | * | 12/2000 | Mc Cord | F17C 13/084 |
| | | | | 211/85.18 |
| 6,830,226 B2 | * | 12/2004 | Field | A62C 13/78 |
| | | | | 248/313 |
| 6,863,198 B1 | * | 3/2005 | Darby | B60R 7/02 |
| | | | | 224/403 |
| 7,631,901 B2 | * | 12/2009 | Diehl | B60K 15/07 |
| | | | | 280/834 |
| 7,934,688 B2 | * | 5/2011 | Wilk | F17C 13/084 |
| | | | | 211/71.01 |
| 8,967,634 B2 | * | 3/2015 | Barnes | B62B 1/142 |
| | | | | 280/43.11 |
| 9,499,105 B1 | * | 11/2016 | Kim | B60R 9/06 |
| 2012/0139304 A1 | * | 6/2012 | Jang | B60N 2/449 |
| | | | | 297/188.04 |
| 2012/0286120 A1 | * | 11/2012 | Ziaylek | F17C 13/084 |
| | | | | 248/312 |

\* cited by examiner

COLLAPSIBLE SECURING SYSTEM FOR SECURING MEDICAL OXYGEN CYLINDERS FOR AIRCRAFT PASSENGER SEATS

FIELD OF THE INVENTION

The present invention relates to a system for securing medical oxygen cylinders, specifically to systems for securing medical oxygen cylinders for aircraft seats.

BACKGROUND

Persons suffering from respiratory dysfunctions require respiratory assistance from auxiliary oxygen cylinders. When providing medical assistance inside means of transport, how the oxygen cylinders are secured is a matter of great importance in order to deliver oxygen to the patients without any risk of the cylinders moving about or falling onto the patient, as well as to ensure that the cylinders are held in vertical position during the entire journey. U.S. Published Patent Application 2012/0139304 discloses a seat for ambulances or the like which is specifically designed to hold oxygen tanks.

In the case of air transport, various systems are currently known for the administration of auxiliary oxygen during decompression events in aircraft, such as those described in U.S. Pat. No. 5,154,374, but in the case of medical care aircrafts, the oxygen cylinders must be capable of being removed from the aircraft along with the patient, which requires the provision of adequate systems for securing the cylinders if need be, especially when the patient is seated, in which the securing system can also be applied or removed as required.

SUMMARY OF THE INVENTION

The present invention relates to a system for securing medical oxygen cylinders for aircraft seats. A novel securing system has been invented and is disclosed herein. The securing system is a collapsible universal securing system which can adapt to the majority of the seats on the market and is quick and easy to install.

The fact that the securing system is collapsible facilitates the storage and transport thereof when not in use, just like an ordinary suitcase, via a series of pivots of the parts strategically arranged on the securing system. Moreover, the securing system enables the attachment of two oxygen cylinders for administration of oxygen to two patients, one on either side of the securing system.

In one embodiment, the novel securing system for securing medical oxygen cylinders comprises three main parts and a fitting system: (i) a base configured such as to be positioned on the passenger seat; (ii) an intermediate structure for securing the oxygen cylinders which is parallel to the base and connected to the base by three legs, each comprising a first end connected to the intermediate structure, and a second end connected to the base, with at least one of the two ends of each leg comprising a pivot in common with the base or the intermediate securing structure; and (iii) a gripping structure which comprises an opening connected to the intermediate securing structure by at least one pivot in common with the intermediate securing structure.

When the securing system is in a deployed position thereof, the intermediate securing structure is arranged at an intermediate height of the oxygen cylinders and the gripping structure is perpendicular to the base thereof. When the securing system is collapsed, the intermediate securing structure and the gripping structure are positioned parallel next to the base.

The securing system being fixed to the seat by a fitting system comprising the seatbelt of the passenger's seat and two straps secured from one end to the gripping structure and from the other end to the fitting of the seatbelt to the actual seat.

BRIEF DESCRIPTION OF THE DRAWINGS

The following figures are provided as an integral part of the description in order to complement said description and to enable better understanding of the features of the invention, in accordance with a preferred practical embodiment thereof. The figures show the following, as non-limiting examples.

DETAILED DESCRIPTION OF THE INVENTION

Figure 1:
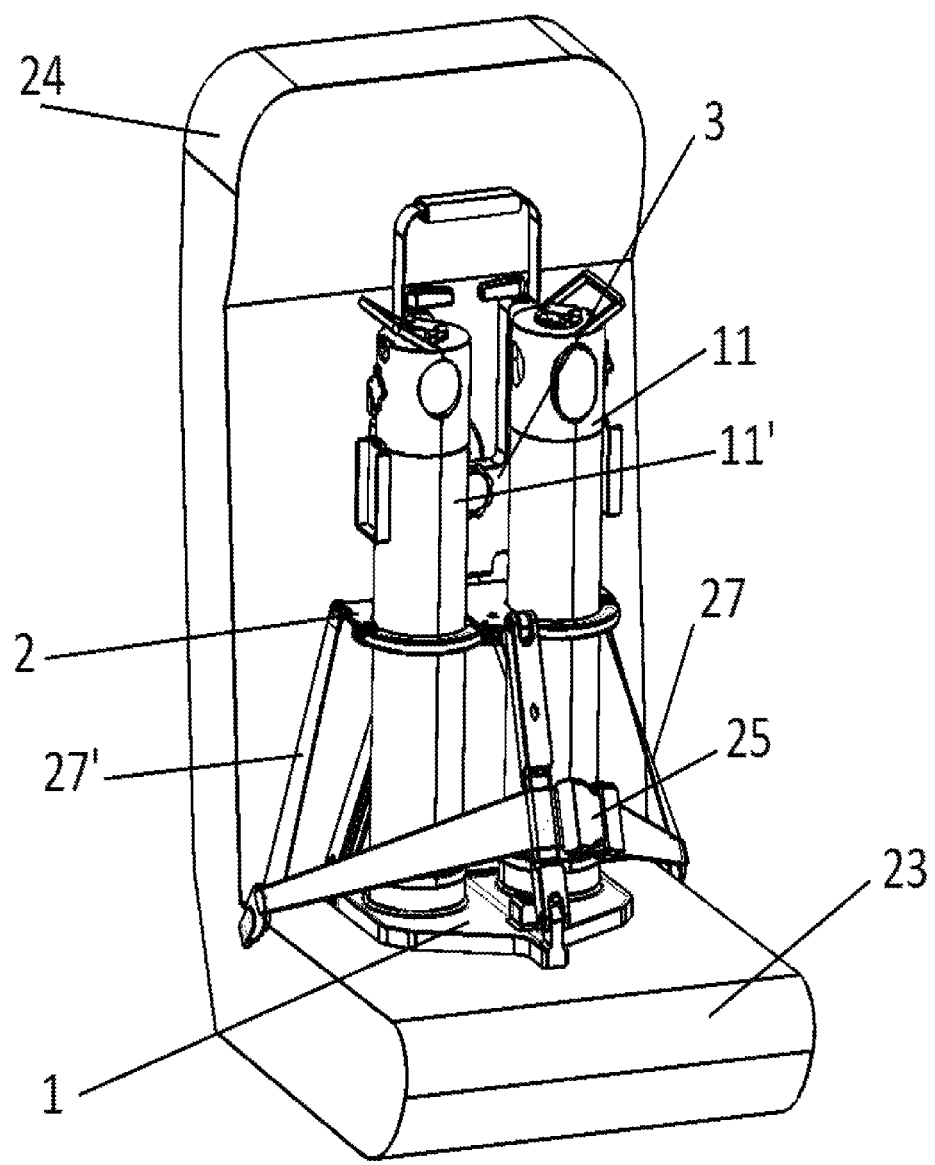
FIG. 1 shows a perspective view of an securing system for attaching oxygen cylinders, according to a preferred embodiment.
Figure 2:
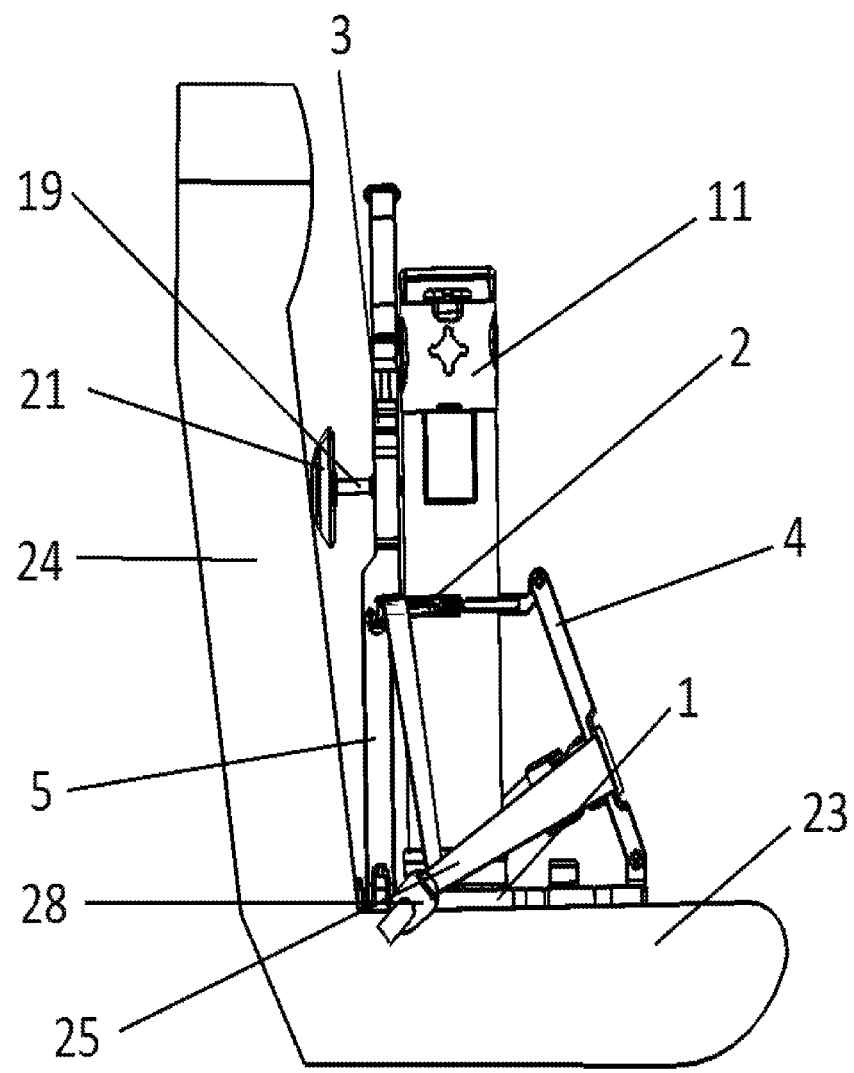
FIG. 2 shows a side view of the securing system of FIG. 1.

FIGS. 1 to 4 show a novel securing system for securing medical oxygen cylinders for aircraft passenger seats. The securing system includes a base (1), an intermediate securing structure (2) and a gripping structure (3).

The base (1) is positioned on the base of the passenger seat (23), and comprises two cylindrical recesses (12, 12') for the bases of each of the oxygen cylinders (11, 11').

Figure 3:
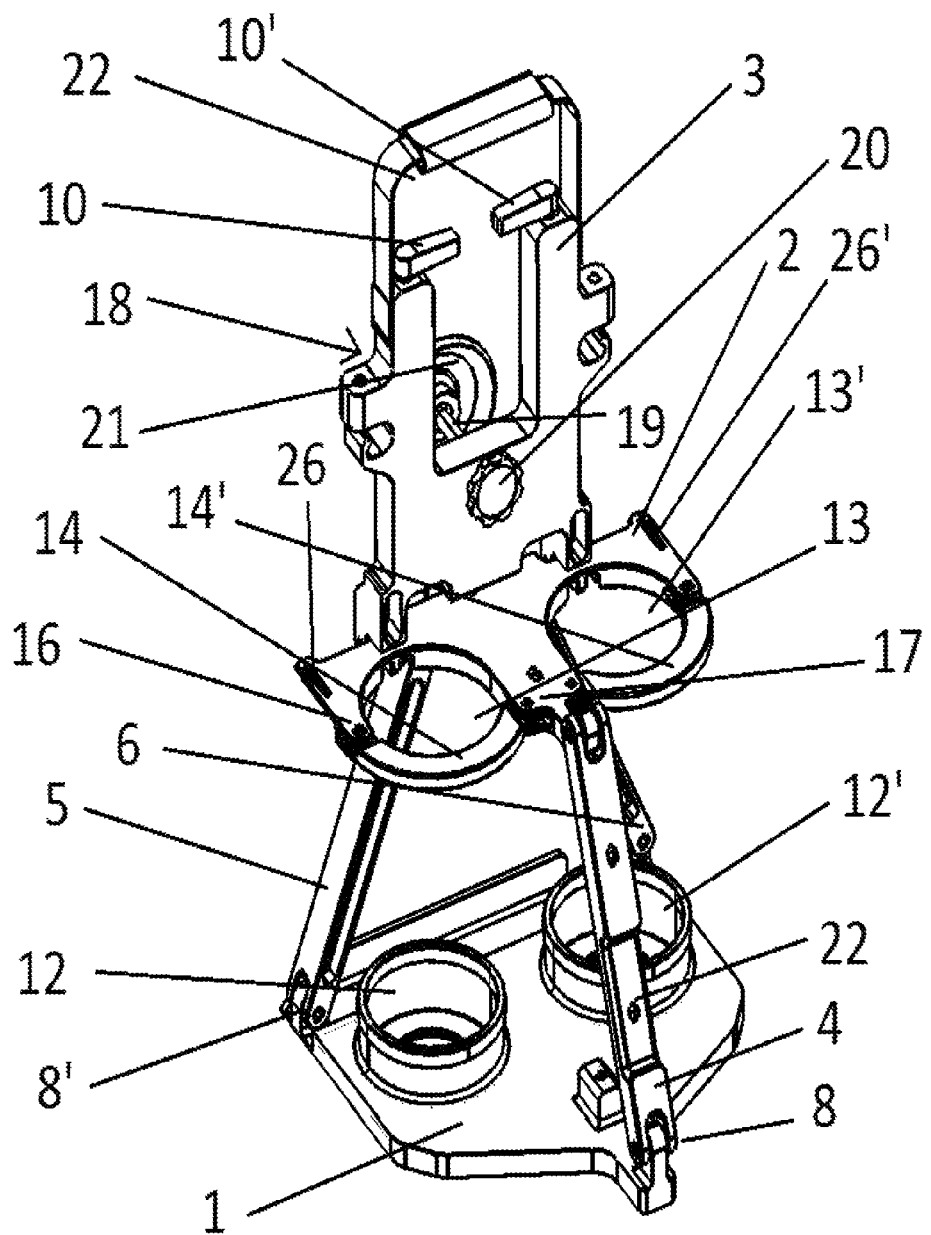
FIG. 3 shows a perspective view of the securing system of FIG. 1, deployed without the oxygen cylinders.

The intermediate securing structure (2) for the oxygen cylinders (11, 11') is arranged parallel to the base (1) and comprises two U-shaped recesses (13, 13') and a locking part (14, 14') for each recess (13, 13'), each U-shaped recess (13, 13') and the locking part (14, 14') thereof being configured to encircle each oxygen cylinder (11, 11'). In fact, the locking parts (14, 14'), as shown in FIG. 3, comprise two ends, one of which (16) is stationary with a pivot in common with the U-shaped recess, and the other one of which (17) is extendable, which enables the oxygen cylinder to be placed and, once the cylinder is correctly positioned, the locking part is locked, securing the extendable end thereof, so as to prevent the oxygen cylinder from moving or shifting from the position thereof. The intermediate securing structure also comprises two slots (26, 26') for holding two straps (27, 27') secured from one end to the slots (26, 26') and from the other end thereof to the fitting (28) of the seatbelt (25) to the passenger seat (23).

The intermediate securing structure (2) is connected to the base (1) by three legs, (4, 5 and 6) each of which comprises a first end connected to the intermediate structure (2) and a second end connected to the base (1). The first stationary leg (4) comprises a first end connected to the intermediate securing structure (2) by a common pivot, and a second end connected to the base (1) by a pivot (8) in common with said base (1). This first leg also comprises a notch (22) for holding the seatbelt (25) of the passenger seat, when the securing system is in the deployed position thereof. The second and third legs (5, 6) are extendable and each comprise one end attached to the base (1) by a pivot (8', 8") in common with said base (1) and a second end connected to the intermediate securing structure by a removable pin (9).

The gripping structure (3) comprises (i) a main member connected to the intermediate securing structure (2) by two common pivots (7, 7'); (ii) two latches (10, 10') for securing the top of the oxygen cylinders (11, 11'); and (iii) an adjustment part (18) which consists of a bolt (19) passing through the gripping structure (3), comprising a first end attached to a cone (21) for resting on the backrest (24) of the seat, configured to rest on the backrest (24) of the seat when the securing system is in the deployed position thereof, and a second end attached to an adjustment wheel (20) provided on the side of the gripping structure that is opposite the backrest (24) of the seat; and (iv) a flexible handle (15) which facilitates the transport of the securing system, in both the collapsed and deployed positioned thereof.

Figure 4:
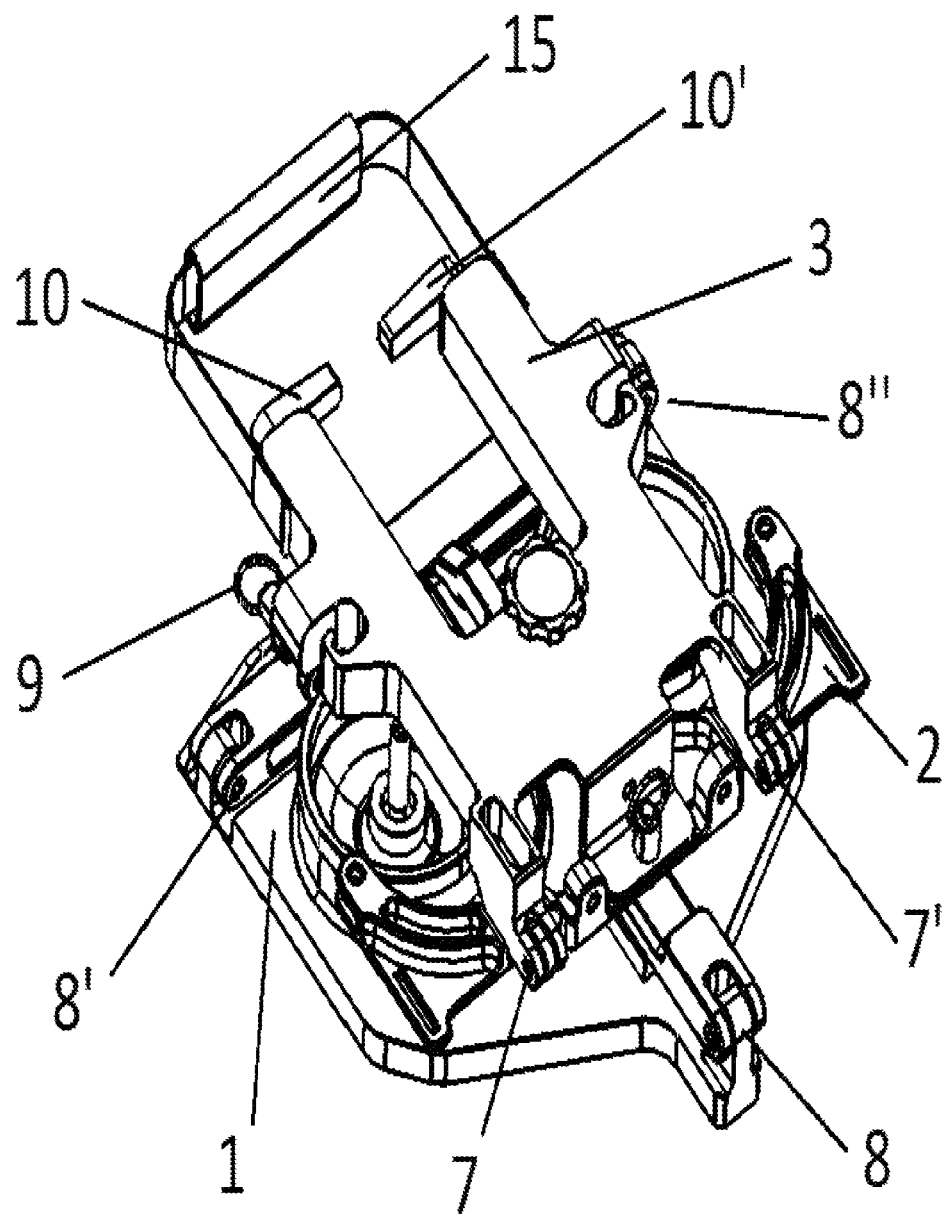
FIG. 4 shows a perspective view of the securing system of FIG. 1, collapsed.

When the securing system is in the deployed position thereof, as shown in FIG. 3, the intermediate securing structure (2) is located at an intermediate height of the oxygen cylinders (11, 11'), and the gripping structure (3) is located perpendicular to the base (1); however, when the securing system is collapsed, as shown in FIG. 4, the intermediate securing structure (2) and the gripping structure (3) are both located parallel next to the base (1).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention is:

1. A collapsible securing system for securing medical oxygen cylinders for a passenger seat, the system comprising:
    a base configured to be positioned on a base of the passenger seat;
    an intermediate securing structure configured to receive oxygen cylinders arranged in parallel, wherein the intermediate securing structure is connected to the base by three legs, each of the three legs comprising a first end connected to the intermediate securing structure and a second end connected to the base, at least one end of each leg comprising a pivot in common with the base or the intermediate securing structure;
    a gripping structure connected to the intermediate securing structure by at least one pivot in common with the intermediate securing structure, the intermediate securing structure being arranged at an intermediate height of the oxygen cylinders and the gripping structure being perpendicular to the base when the securing system is in a deployed position thereof, the intermediate securing structure and the gripping structure being arranged parallel next to the base when the securing system is in a collapsed position thereof.

2. The collapsible securing system according to claim 1, wherein the intermediate securing structure comprises two U-shaped recesses and each U-shaped recess has an associated locking part and each U-shaped recess and the associated locking part encircle a respective one of the oxygen cylinders.

3. The collapsible securing system according to claim 2, wherein each locking part comprises two ends, one end is stationary with a pivot in common with the U-shaped recess, and the other end is extendable.

4. The collapsible securing system for securing oxygen cylinders according to claim 1, wherein the gripping structure includes latches configured to secure a top of each of the oxygen cylinders.

5. The collapsible securing system for securing oxygen cylinders according to claim 1, wherein the base comprises cylindrical recesses and each recess is configured to receive a base one of the oxygen cylinders.

6. The collapsible securing system for securing oxygen cylinders according to claim 1, further comprising:
    a first stationary leg including a first end connected to the intermediate securing structure by a common pivot, and a second end connected to the base by a common pivot;
    second and third extendable legs each having one end attached to the base by a common pivot and a second end connected to the intermediate securing structure by a removable pin.

7. The collapsible securing system for securing oxygen cylinders according to claim 6, further comprising a notch configured to hold the seatbelt while the securing system is in the deployed position.

8. The collapsible securing system for securing oxygen cylinders according to claim 1, wherein the gripping structure comprises an adjustment part configured to adjust a backrest of the passenger seat when in the deployed position.

9. The collapsible securing system for securing oxygen cylinders according to claim 8, wherein the adjustment part comprises a bolt passing through the gripping structure, wherein a first end of the bolt attaches to a cone configured to abut a backrest of the seat and a second end attached to an adjustment wheel provided on a side of the gripping structure opposite the backrest.

10. The collapsible securing system for securing oxygen cylinders according to claim 1, wherein the intermediate securing structure comprises slots and straps secured at one end to the slots and at another end to the fitting of the seatbelt to the actual seat.

11. A collapsible support for medical oxygen cylinders comprising:
    a base configured to seat on a generally horizontal base of a passenger seat;
    an intermediate securing structure configured to support oxygen cylinders parallel to each other, the intermediate securing structure connected to the base by legs, wherein each leg includes a first end connected to the intermediate securing structure and a second end connected to the base;
    a pivot joint between one of the ends of each leg and the base or the intermediate securing structure; and
    a gripping structure connected to the intermediate securing structure by a pivot joint in common with the intermediate securing structure,
    wherein the intermediate securing structure includes an upper end aligned with a middle section of the oxygen cylinders and the gripping structure is transverse to the base when the securing system is in a deployed position and the intermediate securing structure is parallel to the base while the securing system is collapsed.

12. A collapsible support for medical oxygen cylinders comprising:

a base including a lower surface configured to sit on a base of a passenger seat and an upper surface with recesses for a bottom end of each of the oxygen cylinders;

an intermediate securing panel including brackets to at least partially wrap around a mid-section of each of the oxygen cylinders;

legs extending between the intermediate securing panel and the base, wherein at least one of the legs extends from a front section of the base and to a front section of the brackets, and at least one end of each leg is attached to a respective pivot joint configured to allow the base and intermediate securing panel to collapse together, and wherein the one of the legs includes a slot to receive a seat belt.

13. The collapsible support of claim 12 further comprising a bolt engaged with a threaded hole in the intermediate securing panel, wherein one end of the bolt is attached to a cone configured to abut a back rest of the passenger seat and an opposite end of the bolt includes a knob configured to turn the bolt to adjust the position of the cone with respect to the intermediate securing panel.

14. The collapsible support of claim 12 further comprising a gripping structure including pivoting latches attached to the intermediate securing panel at a position aligned with a top end of each of the oxygen cylinders.

15. The collapsible support of claim 12 wherein the legs include two legs each attached to a back edge of the base and to a lower edge of the intermediate securing panel.

* * * * *